(12) United States Patent
Albrecht

(10) Patent No.: US 6,918,754 B2
(45) Date of Patent: Jul. 19, 2005

(54) BLOW MOLD AND BLOW-MOLDING MACHINE

(75) Inventor: Thomas Albrecht, Belingries (DE)

(73) Assignee: Krones AG, Neutraubling (DE)

( * ) Notice: Subject to any disclaimer, the term of this patent is extended or adjusted under 35 U.S.C. 154(b) by 66 days.

(21) Appl. No.: 10/240,486

(22) PCT Filed: Mar. 9, 2001

(86) PCT No.: PCT/EP01/02669

§ 371 (c)(1),
(2), (4) Date: Oct. 2, 2002

(87) PCT Pub. No.: WO01/81060

PCT Pub. Date: Nov. 1, 2001

(65) Prior Publication Data

US 2003/0138517 A1 Jul. 24, 2003

(30) Foreign Application Priority Data

Apr. 22, 2000 (DE) ........................ 200 07 429 U

(51) Int. Cl.⁷ .............................................. B29C 49/56
(52) U.S. Cl. ................. 425/529; 425/451.3; 425/451.9; 425/541
(58) Field of Search .................. 425/541, 451.9, 425/451.3, 595, 529

(56) References Cited

U.S. PATENT DOCUMENTS

| | | | |
|---|---|---|---|
| 3,601,858 A | 8/1971 | Blanchard | |
| 3,635,611 A | * 1/1972 | Mapel | ........................ 425/47 |
| 3,825,396 A | 7/1974 | Kontz | |
| 3,969,059 A | * 7/1976 | Michel | ........................ 425/539 |
| 4,579,519 A | * 4/1986 | Maser et al. | ................. 425/541 |
| 4,737,093 A | 4/1988 | Hori et al. | |
| 4,834,642 A | * 5/1989 | Voss et al. | ................... 425/529 |
| 5,064,366 A | * 11/1991 | Voss | ........................... 425/541 |
| 5,114,335 A | 5/1992 | Tinsley | |
| 5,326,250 A | * 7/1994 | Doudement | .................. 425/541 |
| 5,346,386 A | * 9/1994 | Albrecht et al. | ............. 425/541 |
| 5,375,991 A | 12/1994 | Rydmann et al. | |
| 5,641,451 A | 6/1997 | Orimoto et al. | |
| 5,968,560 A | * 10/1999 | Briere et al. | ............. 425/192 R |
| 6,053,723 A | * 4/2000 | Guiffant et al. | ............. 425/534 |
| 6,280,172 B1 | * 8/2001 | Schwaiger et al. | ......... 425/186 |

FOREIGN PATENT DOCUMENTS

FR           2646802 A1    11/1990

OTHER PUBLICATIONS

Abstract of French document 2646802A1 from the EPO database, dated Nov. 16, 1990.*

* cited by examiner

Primary Examiner—Robert B. Davis
(74) Attorney, Agent, or Firm—Marshall, Gerstein & Borun LLP

(57) ABSTRACT

A blow mold machine, comprising two lockable mold halves. A locking element is fixed onto one mold half and a shaft with at least one recess is mounted in the other mold half. The shaft can be pivoted between a locking position, in which it lies against the locking element and a release position, in which the locking element can be displaced past the recess. A locking mechanism with a particularly simple construction can thus be achieved.

12 Claims, 6 Drawing Sheets

BLOW MOLD AND BLOW-MOLDING MACHINE

REFERENCE TO RELATED APPLICATIONS

This application is the United States national stage (under 35 U.S.C. § 371) of International application PCT/EP01/02669, filed Sep. 3, 2001, and claims priority to German patent application DE 200 07 429.6, filed Apr. 22, 2000.

FIELD OF THE INVENTION

The invention relates to a blow mold with mold parts for a stretch blow molding machine or the like, which comprises at least one locking element attached to a first mold part, and at least one counter-element attached to a second mold part. Furthermore, the invention relates to a blow molding machine, particularly for the stretch-blowing of pre-molded blanks, which comprises at least one such blow mold.

BACKGROUND OF THE INVENTION

Such a blow mold and such a blowing machine are known from FR-PS 2 646 802.

Blow molds, in which a pre-molded blank is molded by blowing with overpressure in the interior of the blow mold—that is to say, profiled out—are thereby used for the stretch blowing of pre-molded blanks for plastic bottles. The blow mold can, for example, thereby comprise two mold parts, which are supported in a rotatable manner around a common axis. By rotating around this axis, the mold parts can be sealed shut, so that a hollow cavity, in which a pre-molded blank can be molded by blowing, forms within the interior of the blow mold bounded by the two mold parts.

Since relatively high pressures, such as 40 bar, for example, are used in stretch blowing, it is necessary that both of the mold parts attached in a swivelable manner be able to be locked in their sealed condition, so that they can resist the strong internal pressures.

In accordance with FR-PS 2 646 802, a projection with a penetrating aperture is thereby provided on one lateral end of one of the mold parts, and an additional, vertically displaced projection is attached to the lateral surface of the second mold part that is positioned directly opposite to it in the closed condition, which projection accommodates a pin projecting out vertically, which can be inserted into or protrude out from the aperture in the projection of the first mold part. The locking of the mold parts in the blowing machine is thereby brought about in the manner of a trailer coupling by means of a stroke movement by several pins attached to a common activating bar.

This solution is, in any event, expensive in mechanical terms since, in addition to a horizontal movement—that is to say, a horizontal rotating of the two mold parts for opening and closing, for example—, a vertical movement of the activating bar with the pins is still additionally necessary in order to achieve the locking of the two mold parts by engaging the vertically projecting pins of one mold part in the apertures provided in the other mold part.

In an alternative manner, U.S. Pat. No. 3,601,858 proposes providing an anchor-like locking element on one of the mold parts, which element has areas projecting upwardly or downwardly on its end assigned to the other mold part. Furthermore, two locking hooks, which are acted on by swivel arms and can be rotated by these swivel arms in such a manner that, in one locking position, they encompass the projecting areas of the anchor element attached to the other mold part so that this is set firmly in its position, are provided on the other mold part. Through the swiveling of the locking hooks around their swivel arms, the contact of the hook with the locking anchor of the other mold part can be ended again, and both of the mold parts can thereby be opened.

In any event, this structure, which involves providing hook-shaped elements with corresponding swivel arms which can be retracted relative to one another, can also only be carried out in relatively expensive mechanical terms.

SUMMARY OF THE INVENTION

Proceeding from this basis, the task of the present invention is to make available a blow mold, as well as to make available a corresponding blow molding machine with such a blow mold as makes a constructionally simple locking of the mold parts possible.

The solution in accordance with the invention provides that the counter-element of the second mold part is a shaft which can, by means of rotation around a longitudinal axis proceeding through the shaft, be rotated between a locking position, in which the blow mold is locked, and an unlocking position, in which the blow mold can be opened, and the shaft has such an external contour that the shaft is, in the locking position, at least partially applied against the locking element and, in the unlocking position, releases the locking element.

This design of the blow mold has the advantage that the locking can be carried out in a constructionally simple manner. A complicated mechanical system, such as was otherwise conventional, can consequently be dispensed with. That is to say, neither the solution of using a lock in the manner of a trailer coupling, with a movement of the locking components in two perpendicular planes, which is known from the French patent publication FR-PS 2 646 802, nor the mechanically complicated solution in accordance with the U.S. Pat. No. 3,601,858, with the use of hooks that are acted upon and rotated by arms configured in a swivelable manner, is necessary.

In comparison with that, the use in accordance with the invention of a shaft which, for locking or unlocking, only needs to be rotated around its longitudinal axis, is mechanically easier to design, and thereby less susceptible to failure and less maintenance-intensive. Moreover, very short switching times result.

The shaft advantageously has at least one recess on its circumferential area which the locking element for opening the blow mold can at least partially move past. In one appropriate configuration of the locking element, it is consequently possible, upon joining the two mold parts together, to slide the locking element past the shaft if the recess is directed towards the locking element moving past, so that the mold parts can be closed.

By rotating the shaft around its longitudinal axis, the area of the recess can thereupon be rotated away from the locking element, and an area of the circumference of the external contour of the shaft that does not have a recess can then be applied against the locking element in such a manner that this can not be slid back. This makes it possible for both mold parts to be closed and locked.

Consequently, in this form of implementation, only the provision of a recess in a shaft is necessary in order to make the locking or the unlocking possible. This is simpler, in constructional terms, than providing a mechanical system or hook which can be moved in two planes and is acted upon by swiveling arms, as was necessary in the known solutions.

In one preferable form of implementation, two shafts, which can each be rotated between the locking and the unlocking position around a longitudinal axis proceeding through them, are attached to the second mold part as counter-elements. Since it is not just one shaft, but instead two shafts, which are present as counter-elements, the securing function—that is to say, the locking function—can be realized in a mechanically more stable manner, since not just one shaft, but instead two shafts, are applied to different areas of the locking element for the purpose of locking, and this can consequently maintain the locking in a more stable manner.

Both of the counter-elements are thereby applied at a distance from one another in such a manner that, in the unlocking position, the locking element can be at least partially guided between both of the shafts and, in the locking position, the contours of the two shafts are at least partially applied against the locking element in such a manner that the blow mold is solidly locked.

It is assumed that both of the shafts have recesses at the same height. If both of the shafts placed at a distance from one another are thereby rotated in such a manner that both recesses are oriented towards one another, then an enlarged intermediary space between both of the shafts can be provided at the level of the recesses. In this case, which corresponds to the unlocking position, a locking element can then be slid through the area of the two recesses of the shafts until both of the mold parts are closed.

For the purpose of locking, the area of the recess can, by rotating the two shafts, be rotated far enough outwardly that they are no longer positioned opposite to one another and the penetrating passage between the two shafts is constricted. If the locking element is thereby configured in such a manner that it is now at least partially applied against the contour of the two shafts, and an area enlarged in width, which was guided through both of the recesses in the unlocking position, can now no longer be slid back between the two shafts, then a locking of the two mold parts can be brought about.

In the case of the presence of two shafts as counter-elements, the locking element is, preferably, configured in an essentially T-shaped manner. This means that the locking element must have an area that is expanded in such a manner that, in the unlocking position, for example, it can be slid past both of the recesses in order to close the mold parts. The expanded area must, at the same time, thereby be wide enough that it can not be slid back through the two shafts if these shafts are rotated into the locking position. This makes a particularly secure locking of mold parts possible.

Furthermore, the blow mold can comprise a device for the synchronous rotation of both of the shafts. This makes it possible, in a simple manner, for the recesses, in both of the shafts, to be rotated inwardly simultaneously in order to be positioned opposite one another, for example, and to create a particularly large free space for carrying out the locking element, or to be rotated outwardly simultaneously, in order for the intermediate space to be constricted to a particularly great degree and for the locking position to thereby be occupied.

In order to rotate the at least one shaft, a gear is to be attached to at least one of the ends of the shaft. A rotation of the shafts can then be brought about in a simple manner by means of a gear mechanism of the type as known per se.

The gear is, preferably, to thereby be brought into engagement with a toothed rack or a gear element in such a manner that, by displacing the toothed rack or by rotating the gear element, the gear, and thereby the shaft, can be rotated around the longitudinal axis proceeding through the shaft. That is to say, in the case of a toothed rack, for example, a rotary movement of the shafts can be produced by means of a back-and-forth movement of the same.

If both of the shafts are in engagement with the same toothed rack or the same gear element, then the synchronous rotation of the two shafts, for example, can be brought about in a mechanical manner without an additional electronic device or the like for adjusting the time of the rotational movements being urgently necessary.

The rotation of the at least one shaft can be automated if a contact switch—which, in the closed condition of the blow mold, comes into contact with an external surface of the locking element—is provided. In this case, the beginning of the locking can be initiated automatically by rotating the shaft(s) if the switch is closed by touching the locking element.

BRIEF DESCRIPTION OF THE DRAWINGS

Examples of implementation of the invention are described in further detail in the following with the help of the appended diagrams.

These depict the following.

DETAILED DESCRIPTION OF THE INVENTION

A first form of implementation of a blow mold in accordance with the invention will be described in the following by means of FIGS. 1 to 4.

Figure 1:
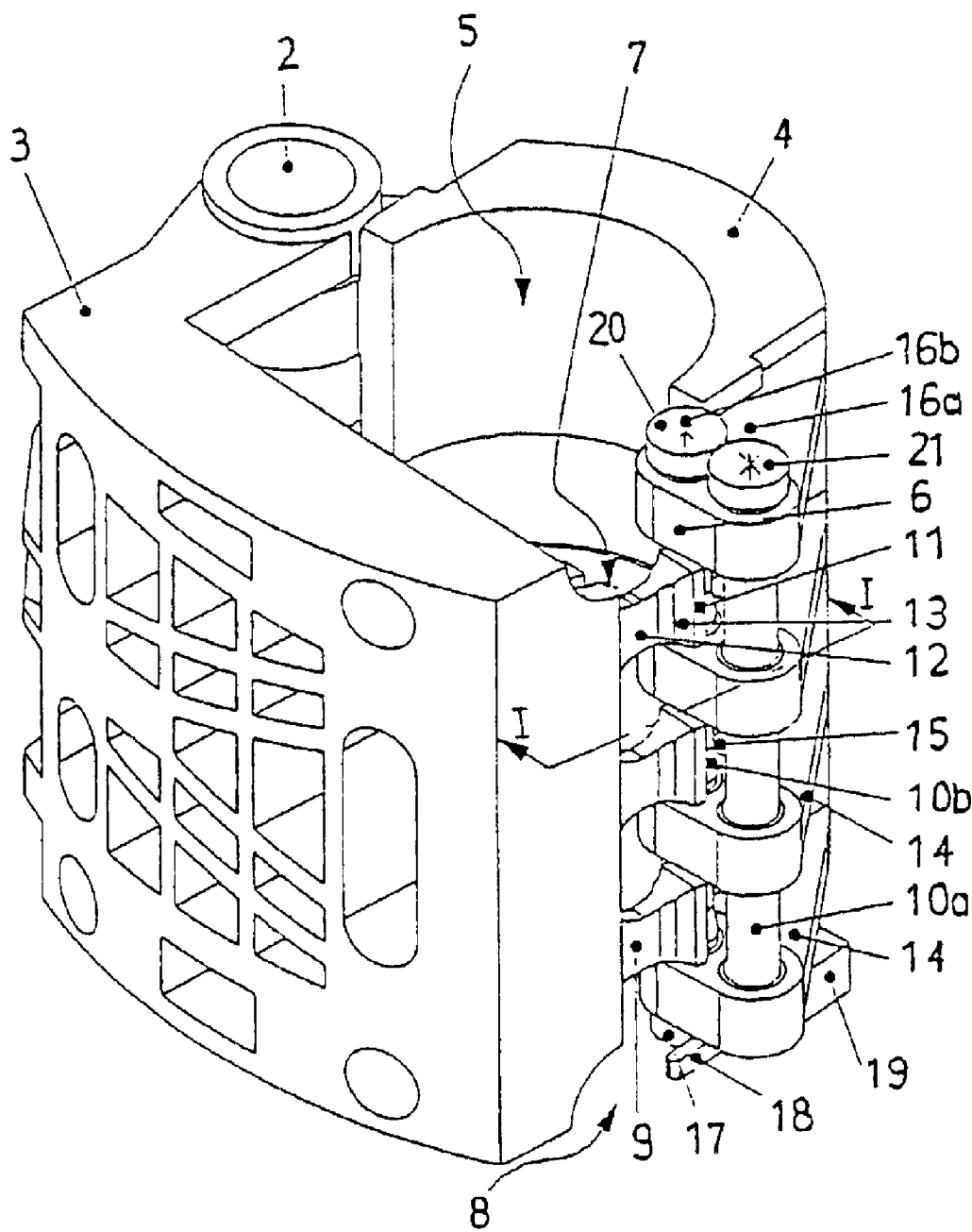
FIG. 1: A perspective view of a blow mold in accordance with a first form of implementation of the invention, which comprises two swivelably-supported mold parts with corresponding locking units or counter-elements, as the case may be.

A blow mold, which is used in a stretch blow molding machine of the type as known per se, is identified in FIG. 1 with the reference numeral (1). The blow mold comprises two mold parts which can rotate around a connecting axis (2) and serve as a shape support, a first mold part (3), and a second mold part (4). Both of the mold parts (3, 4) are configured in such a manner that they can, in the closed condition, form an internal hollow cavity (5) in which, by means of mold inserts; not depicted, a pre-molded blank, also not depicted, is inflated in shape in a stretch blowing process: that is to say, it can be profiled out.

For the purpose of sealing the two mold parts (3, 4), these are swiveled around the connecting axis (2) in such a manner that both of the lateral surfaces (6, 7) impact against one another. A partially opened, unlocked condition of the two mold parts (3, 4) is thereby depicted in FIG. 1.

Although not depicted in FIG. 1, the blow mold (1) also comprises, in addition to both of the mold parts (3, 4) and their mold inserts, a base form and, if necessary, a cover form as well. These elements function in such a manner that, when the blow mold is closed, a high pressure that is sufficient for stretch blowing, such as 40 bar, for example, can be applied in the interior (5).

Figure 2:
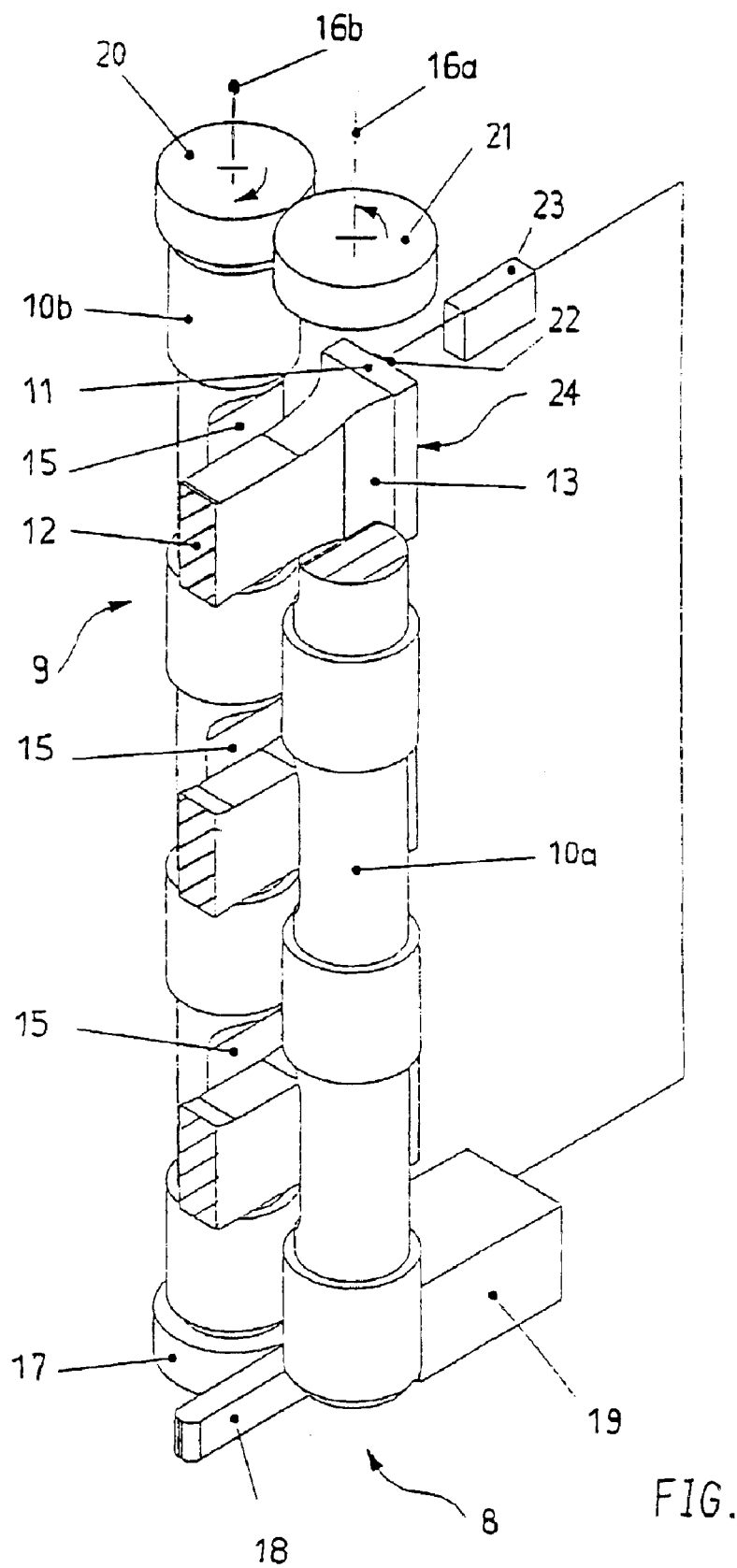
FIG. 2: A detailed perspective view of the locking device of the blow mold in accordance with FIG. 1.

Details of the locking device (8) of the blow mold (1) can be seen in FIG. 1 and, in particular, in FIG. 2 as well. The locking device (8) thereby comprises locking elements (9) and counter-elements (10). In particular, three individual locking elements (9) positioned along the longitudinal axis of the blow mold (1)—that is to say, positioned spaced at a distance from top to bottom—are thereby integrally formed with the lateral surface (7) of the first mold part (3). These individual locking elements (9) thereby protrude horizontally from the side wall (7) and have a cross-section that is shaped in an approximately T-shaped manner in a horizontal plane, whereby the transverse support bar (11) of this T-shaped locking element (9) is integrally formed with the end of the locking element (9) positioned away from the lateral surface (7), and is wider than the longitudinal support bar (12) of the same. At the transition between the transverse support bar (11) and the longitudinal support bar (12), areas rounded off externally (13) are formed on the left and on the right.

In the area of the lateral surface (6) of the second mold part (4), two vertically-proceeding shafts (10-a, b) are attached as counter-elements. In the area of the lateral surface (6), the mold part (4) thereby comprises individual areas (14) positioned vertically at a distance and projecting horizontally to the outside. Four such areas (14) are present in the form of implementation depicted. Two penetrating apertures, through which the shafts (10-a, b) are placed and supported and, specifically so, in parallel with the connecting axis (2) and at different distances from the same, are provided in each of these projecting areas (14).

These penetrating apertures, and thus the shafts (10-a, b) supported therein, are thereby attached radially at a distance from one another. The shafts (10-a, 10-b) are configured equal to one another and have an oblong, essentially cylindrical shape. In the area between two projecting areas (14), the inserted shafts (10-a, 10-b) each have recesses (15) on the circumferential area; that is to say, in this area of the recesses (15), the shafts (10-a, 10-b) are no longer cylindrical in cross-section, but are instead flattened.

Figure 3:
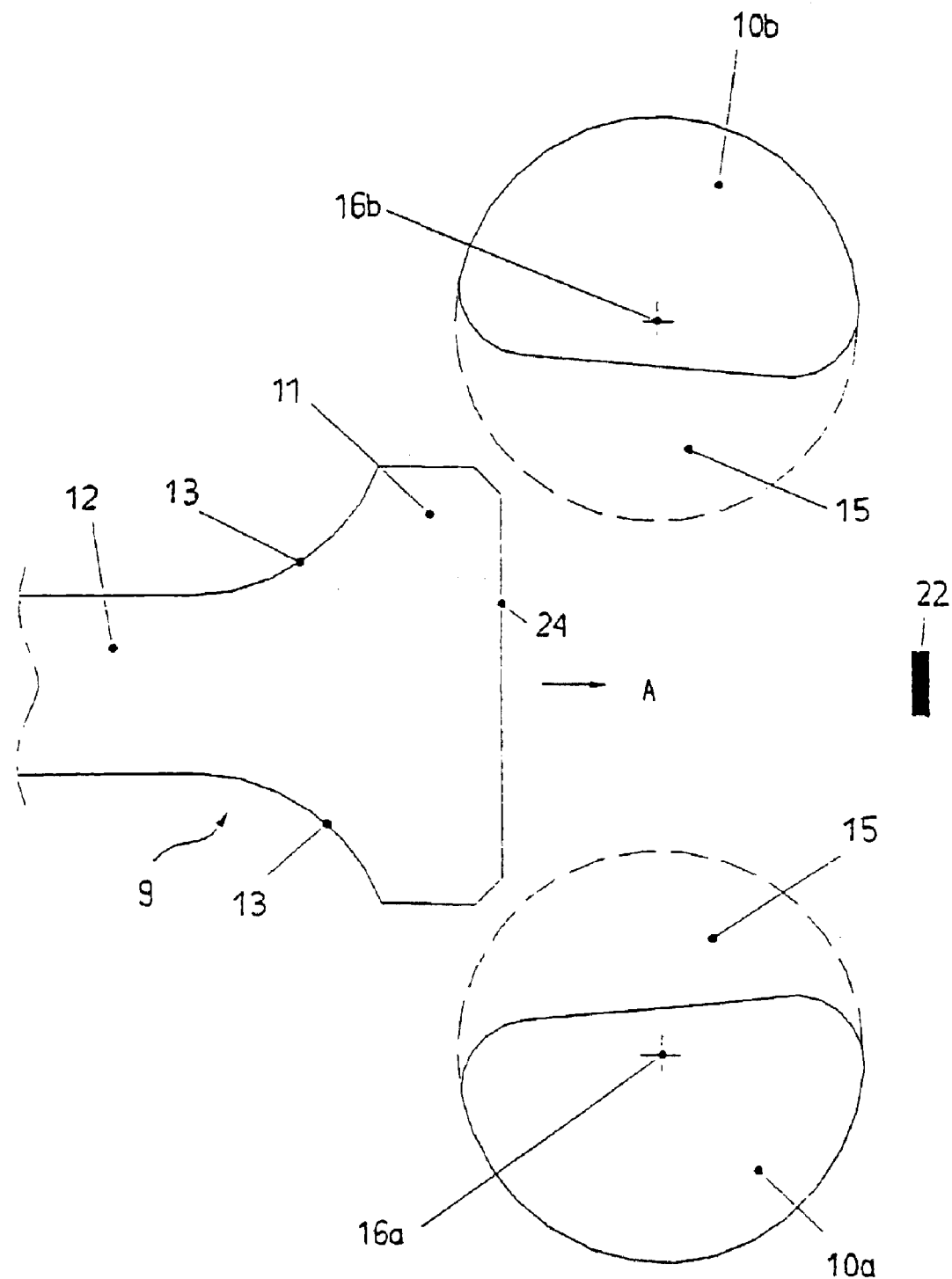
FIG. 3: A schematic cross-sectional view of the locking device of the blow mold in accordance with FIGS. 1 and 2, in a plane perpendicular to the longitudinal axis of the shafts, whereby the locking device is located in an unlocking position.
Figure 4:
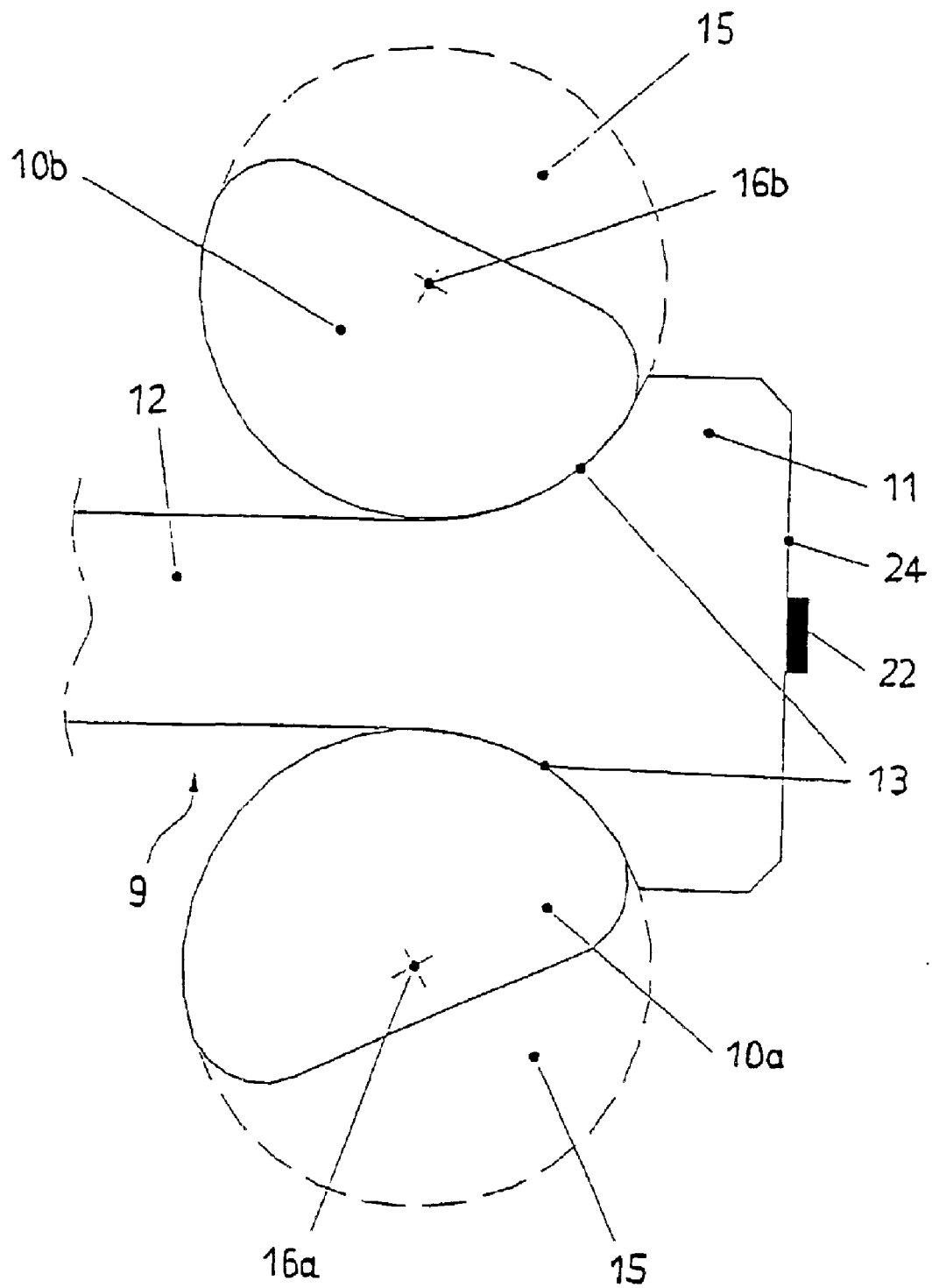
FIG. 4: A schematic view of the locking device of the blow mold in accordance with FIGS. 1 and 2, in a plane perpendicular to the longitudinal axis of the shafts, whereby the locking device is located in a locking position.

The views of FIGS. 3 and 4 depict sectional planes through one of the locking elements (9) and both of the shafts (10-a, 10-b) in a horizontal plane along the line I—I in accordance with FIG. 1. The flattened shape of the two shafts (10-a, 10-b) in the area of the recesses (15) is thereby depicted by the solid line, and the essentially cylindrical shape of the two shafts (10-a, 10-b) in the areas in which these recesses (15) are not present is shown with the help of the dotted lines.

Each of the shafts (10-a, 10-b) is supported in a rotatable manner around a longitudinal axis proceeding through the center of the cross-section (16-a, b). The following mechanism is provided for the rotation of the shafts (10-a, 10-b) around their corresponding rotational axes (16-a or 16-b), respectively):

As can be seen in FIG. 2, in particular, a gear (17), which forms the lower end of the shaft (10-b), is attached to the lower side of the second shaft (10-b). This gear (17) is attached and supported immediately below the lowest of the four projecting areas (14) of the partition of the second mold part (4). This gear (17) engages with a toothed rack (18), which is connected with a control unit (19). This control unit (19) can be an electromechanical unit or a pneumatic cylinder, for example, into which or out from which the toothed rack (18) is moved. The control unit (19) can consequently bring about a back-and-forth movement of the toothed rack (18). The toothed rack (18) thereby engages with the gear (17) in such a manner that a back-and-forth movement of the toothed rack (18) leads to a rotational movement of the second shaft (10-b) inserted in the projecting areas (14), around the longitudinal axis (16-b) of the said shaft.

A second gear (20), which is, like the gear (17), solidly connected with the other shaft (10-b), is attached to the end of the shaft (10-b) positioned opposite to the gear (17), above the uppermost of the projecting areas (14). This second gear (20) engages, in turn, with a third gear (21) that is attached, in approximately the same horizontal plane as the second gear (20), to the upper end of the other shaft (10-a). Both of these gears (20, 21) engage with one another in such a manner that the rotation of the second gear (20) leads to a rotation of the third gear (21) and thereby to a rotation of the shaft (10-a).

The mechanism for the rotation the two shafts (10-a, 10-b) is therefore configured in such a manner that, by means of a back-and-forth movement of the toothed rack (18), both of the shafts (10-a, 10-b) can be synchronously rotated by means of the gears (17, 20, 21) and, specifically so, in opposite directions. It should be noted that, for the sake of greater clarity, the area of the shaft (10-a) below the third gear (21) is not depicted in FIG. 2, in order to be able to better illustrate the structure of the locking element (9) in this area.

As can be noted, in particular, by means of FIG. 4, which is explained in still more precise detail in the following, the rounded areas (13) of the individual locking elements (9) are formed in such a manner that they approximately correspond to the external contour of the shafts (10-a, 10-b) in the area in which no recesses (15) are present on the circumferential area.

That is to say, since the shafts otherwise have an approximately cylindrical shape, the radius of curvature of these rounded areas (13) corresponds approximately to the radius of the shafts (10-a, 10-b), so that the external contour of the shafts (10-a, 10-b) can, in their non-flattened area, be closely applied to these rounded areas (13) of the corresponding locking element (9) in the locking position in accordance with FIG. 4.

Although the locking elements (9) in accordance with the form of implementation described have, apart from the areas of the recesses (15), an essentially T-shaped form, and the shafts (10-a, 10-b) have an essentially cylindrical cross-section, the present application is not limited to these specific shapes.

That is to say, the shafts (10-a, 10-b) could also have any other non-cylindrical shape, such as a polygonal cross-sectional form, for example, as long as they contain recessed areas which make it possible for the area released between the recesses to be somewhat greater than the width of the locking element to be guided through both of the shafts. At the same time, the shaft must thereby be configured in such a manner that, in the locking position in which the recesses are not oriented towards one another, the penetrating passage between the two shafts (10-a, 10-b) is so narrow that the wide area (11) of the locking elements (9) can not be guided through this intermediary space.

The locking device (8) additionally comprises a contact switch (22) which is, in the stated example of the uppermost of the three locking elements, attached in the area of one of the horizontally-spaced locking elements (9). This contact switch (22) is thereby attached to the second mold part (4) in such a manner that the forward lateral external surface, in the area of the portion (11) of the locking element (9) that is shaped as a transverse support bar, comes into contact with this contact switch (22), as depicted in FIG. 2, if both of the mold parts are closed. Furthermore, a control unit (23), which is connected with this contact switch (22) and the control unit (19) of the toothed rack (18), is present, which control unit (23), in the event of the contact of the contact switch (22) with the locking element (9) of the toothed rack (18), moves out far enough that both of the shafts (10-a, b) are rotated into their locking position.

The blow mold in accordance with the first form of implementation is now used as follows:

In the opened condition of the blow mold, both of the shafts are rotated into the position depicted in FIG. 3, in which the recesses (15) are oriented to one another, so that the intermediate space between both of the shafts (10-a, 10-b) is enlarged far enough that the broad side—that is to say, the area (11) of the locking element (9) that is similar to a transverse bar of the "T"—can be guided through the intermediate space.

A pre-molded blank is now brought from above into the hollow cavity (5), between the mold inserts, which are not depicted, and a base form (not depicted) and a cover form, which is possibly to be used for the sealing of the lower or upper side of the blow mold, are subsequently moved upwardly or downwardly, as the case may be, and both mold parts (3, 4) are swiveled around their connecting axis (2) onto one another until the lateral surfaces (6, 7) come into contact with one another. The individual locking elements (9) are thereby moved approximately into the direction (A), as depicted in FIG. 3.

The controlled swiveling movement of both of the mold parts (3, 4) is carried out for long enough until the forward side (24) of one of the locking elements (9) comes into contact with the contact switch (22).

In this case, which is illustrated in FIG. 4, the toothed rack (18) is moved out over the control unit (23) by means of the control unit (19), so that the pinion (17) engaged with the toothed rack is thereby rotated. With the rotation of the pinion (17), the second gear (20) attached to the other end of the shaft (10-b) also rotates and thereby, in a synchronous manner, the third gear (21) on the other shaft (10-a). Both of the shafts (10-a, 10-b) are consequently rotated simultaneously through a moving out of the toothed rack (18).

The control unit (19) thereby moves the toothed rack (18) far enough out that both of the shafts (10-a, 10-b) are rotated into the locking position depicted in FIG. 4. In this condition, areas of the cylindrical external contour of the shafts (10-a, 10-b)—that is to say, areas in which the recesses (15) are not present—are applied to the rounded areas (13) of the locking elements (9). This support leads to the fact that the locking element (9) is locked in relation to the shafts functioning as counter-elements (10-a, 10b), and can not be slid back into the unlocking position depicted in FIG. 3.

If the blow mold (1) has been locked in this manner, then the stretch blowing process can be carried out in the manner as known per se. That is to say, the pre-molded blank is, at temperatures from 90 to 100° C., blown out into a bottle through the fact that the pre-molded blank is first drawn in the sealed hollow cavity (5) by means of a cam-controlled drawing bar, and the bottle is then, in a time-delayed manner, stressed with the pre-blowing pressure (12 to 25 bar). The bottle is then subsequently profiled out with the final blowing pressure of approximately 40 bar, and is cooled off in the blow mold (5).

After the release of the pressure and the cooling off—that is to say, after the pressure in the interior of the blow mold drops down from a given high value to a lower value—the the control unit (19) can receive a control impulse, so that it automatically moves the toothed rack (18) back in again until both of the shafts (10-a, 10-b) are again rotated from the locking position depicted in FIG. 4 into the unlocking position depicted in FIG. 3. The blow mold (1) can, by swiveling the two mold parts (3, 4) around the connecting axis (2), subsequently be completely opened, and the bottle then removed and conveyed to a transport system.

Figure 5:
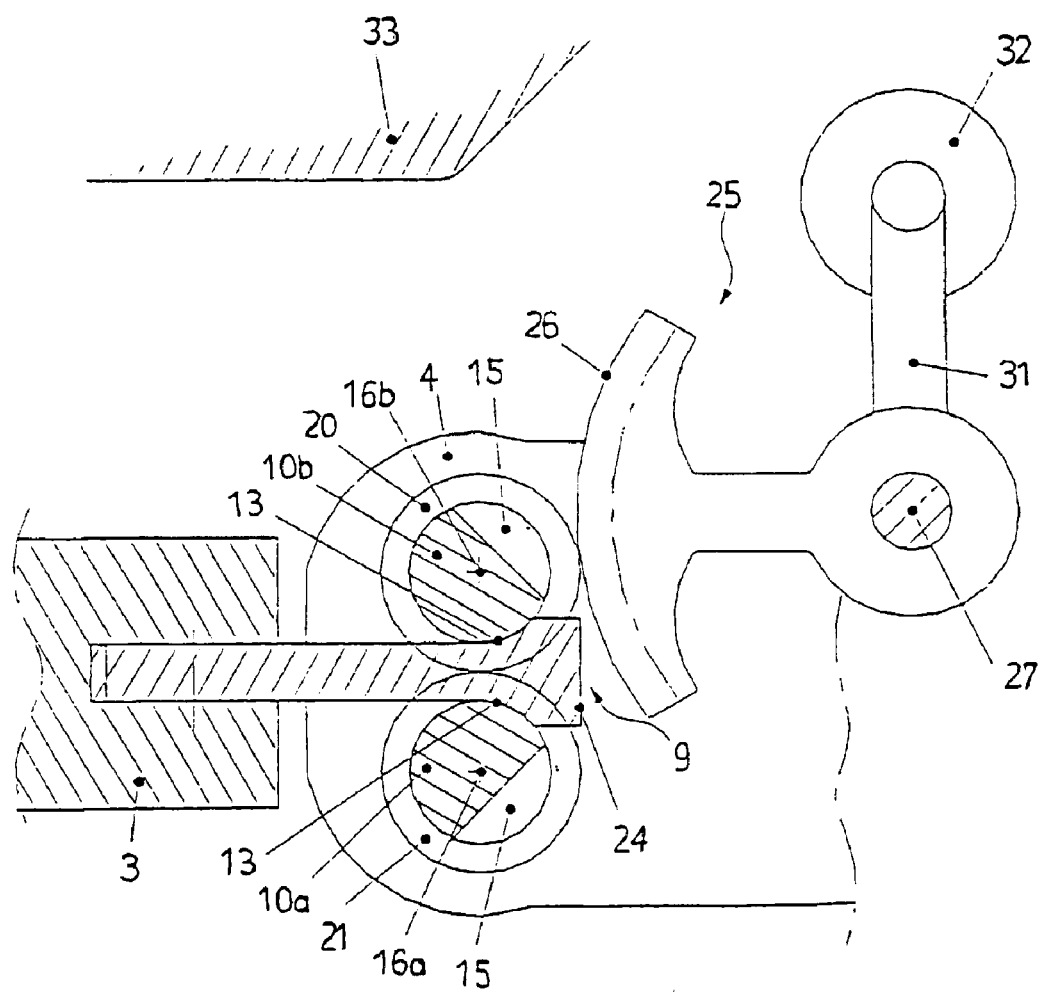
FIG. 5: A schematic view of details of a blow mold in accordance with a second form of implementation.

Details of a second form of implementation of the present invention are presented in FIG. 5. The construction and manner of operation of this blow mold essentially correspond to FIGS. 1 to 4. Identical components are designated by the same reference numerals as in the first form of implementation. The schematic view from above illustrates a locking position in which both of the mold parts (3, 4) are sealed.

The locking device is, in a manner similar to FIG. 4, thereby located in the locking position. That is to say, the locking element (9) is slid, with its frontal area, through the intermediate space between both of the shafts (10-a, 10-b), and turns these in such a manner that a portion of their external contours is applied against the rounded areas (13) of the locking element (9).

The second form of implementation differs from the first one, in particular, through the fact that the mechanism for the rotation of the two shafts is different. Whereas, in the first form of implementation, a toothed rack (18) that can be moved back and forth is used for the synchronous rotation of the shafts (10-a, 10-b), a toothed segment (25) is provided for that purpose in the second form of implementation.

This toothed segment (25) has a toothed external contour (26) which engages with the gear (20) attached to the upper end of the shaft (10-b). The toothed segment (25) can be swiveled around an axis (27) by means of an arm, so that the rotation of the external contour (26) leads to a rotation of the second gear (20) and thereby of the one shaft (10-b) and, through the engagement of the second gear (20) with the third gear (21), to a synchronous rotation of the other shaft (10-a) connected with the third gear (21). The toothed segment (25) is rigidly connected with a lever (31) on which a cam roller (32) is supported in a rotatable manner. This cooperates with a control cam (33) which is positioned, in a stationary manner, on the blow mold rotating on a circular track and, at defined points of the circular path, either opens or closes the locking device, as the case may be.

Figure 6:
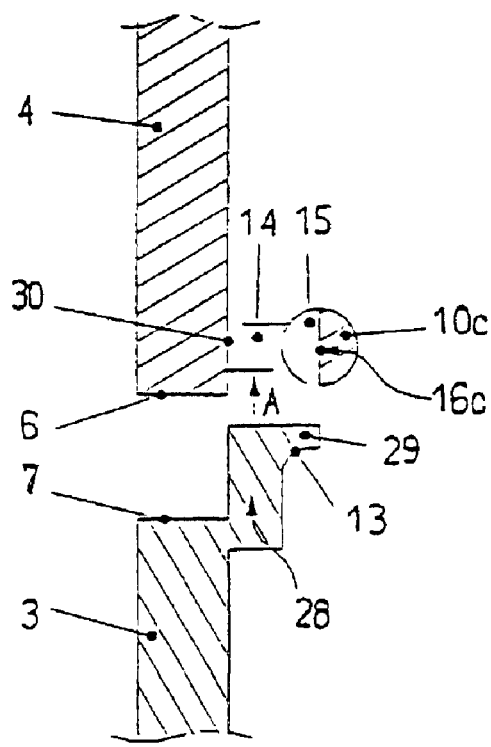
FIG. 6: A schematic cross-sectional view of a locking device of a blow mold in accordance with a third example of implementation, which represents an unlocking position perpendicular to the longitudinal axis of the shaft.
Figure 7:
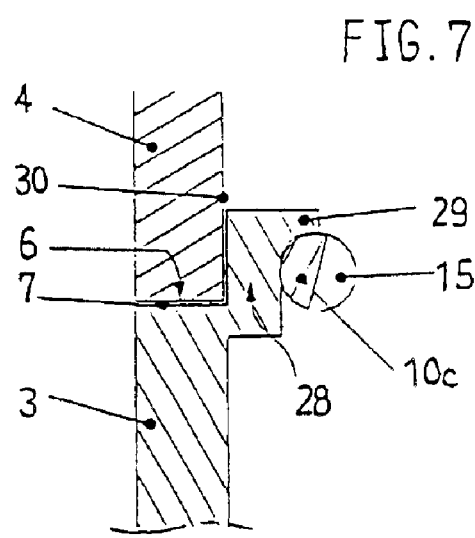
FIG. 7: The locking device in accordance with FIG. 6, in a locking position.

Details of a third form of implementation of the present invention are depicted in FIGS. 6 and 7. Identical components are yet again identified by the same reference numerals. The blow mold in accordance with this third example of implementation differs from both of the preceding ones through the configuration of the locking device.

As can be seen in FIG. 6, only one shaft (10-c) is present as a counter-element in this form of implementation, and not two, as in both of the other forms of implementation.

This individual shaft (10-c) can, in a manner similar to the shaft (10-a) in the first and second form of implementation, thereby be supported in a rotatable manner in the individual projecting areas (14) of the second mold part (4). The locking element (9) is hereby laterally formed on the frontal surface (7) of the first mold part (3) in essentially the shape of an "L". The longitudinal support bar of this "L"-shaped locking element (28) is thereby configured in such a manner that, in the area between the rotating shaft (10-c) and the wall (30) of the second mold part (4), it can be guided against this partition (30) positioned closely between two areas (14) projecting vertically in a spaced manner if the shaft (10-c) is rotated into the unlocking position.

This unlocking position, which is depicted in FIG. 6, is characterized in that, the recess (15) on the shaft (10-c) is directed inwardly to the partition (30) of the mold part (4), so that the broad area (29)—that is to say, the transverse support bar of the "L"-shaped locking element (28)—can be guided between the partition (30) and the shaft (10-c). If both of the mold parts (3, 4) are completely closed through the fact that, as depicted in FIG. 7, both of the frontal surfaces (6 and 7) come into contact, then the broad forward area (29) of the locking element (28) has already been guided past the shaft (10-c).

In a manner similar to the first two forms of implementation, the shaft (10-c) can, in this case, also be rotated around its longitudinal axis (16-c) in an automatic manner, such as by being driven by a stepper motor, from the unlocking position depicted in FIG. 6 into the locking position depicted in FIG. 7, in the area of the external contour of the shaft (10-c) which has no recess, being partially supported against the rounded area (13) between the transverse- and the longitudinal support bar of the "L"-shaped locking element, and a sliding back of the locking element (28), and thereby of the mold part (3), is prevented by that means.

The blow molds in accordance with the invention consequently make a locking possible in a particularly simple constructional manner whereby, because of the slight inertia of the shafts (10) to be rotated, an extremely rapid locking and unlocking is possible with small activation efforts.

What is claimed is:

1. A blow mold (1) with mold parts (3,4) for a stretch blow molding machine or the like, comprising at least one locking element (9, 28) attached to a first mold part (3), and at least one counter-element (10-a, b, c) attached to a second mold part (4), the counter-element (10-a, b, c) being a shaft (10-a, b, c) positioned in parallel to a connecting axis (2), around which the mold parts (3, 4) can be swiveled, which shaft is locked by means of rotation around a longitudinal axis (16-a, b, c) proceeding through the shaft, the shaft being rotatable between a locking position, in which the blow mold (1) is locked, and an unlocking position, in which the blow mold (1) can be opened, and the shaft (10-a, b, c) having such an external contour that the shaft (10-a, b, c) is, in the locking position, at least partially applied against the locking element (9, 28) and, in the unlocking position, releases the locking element (9, 21).

2. A blow mold in accordance with claim 1, wherein the shaft (10-a, b, c) has at least one recess (15) on the circumferential area, to which the locking element (9, 28) can, for the opening of the blow mold (1), be moved at least partially forward.

3. A blow mold in accordance with claim 1, and two shafts (10-a, b) are attached on the second mold part (4), each of which shafts can each be rotated around a respective longitudinal axis (16-a, b) proceeding through it, between the locking position and the unlocking position.

4. A blow mold in accordance with claim 3, wherein both of the shafts (10-a, b) are attached at a distance from one another in such a manner that, in the unlocking position, the locking element (9) is at least partially guided between both of the shafts (10-a, b) and, in the locking position, the contours of the two shafts (10-a, b) are at least partially applied to the locking element (9) in such a manner that the blow mold is solidly locked.

5. A blow mold in accordance with claim 3, wherein the locking element (9) essentially has a "T"-shaped form.

6. A blow mold in accordance with claim 3, and a device (17–23) for the synchronous rotation of the two shafts (10-a, b).

7. A blow mold in accordance with claim 6, wherein the device is a gear (17) attached to at least one of the ends of the at least one shaft (10-a, b, c).

8. A blow mold in accordance with claim 7, wherein the gear (17) engages with one of a toothed rack (18) or a gear element (25) in such a manner that, by displacing the toothed rack (18) or by rotating the gear element (25), the gear (17) and, by that means, the shaft (10-a, b, c), can be rotated around the longitudinal axis (16-a, b, c) proceeding through the shaft (10-a, b, c).

9. A blow mold in accordance with claim 1, and a contact switch (22) which, in the closed condition of the blow mold (1), comes into contact with an external surface (24) of the locking element (9, 28).

10. A blow mold in accordance with claim 1, wherein the two shafts (10-a, 10-b) are spaced at different distances from the connecting axis (2).

11. A blow molding machine comprising:
a blow mold having at least one locking element attached to a first mold part, and at least one counter-element attached to a second mold part,
the counter-element being a shaft positioned in parallel to a connecting axis, around which the mold parts can be swiveled which shaft is locked by means of rotation around a longitudinal axis proceeding through the shaft,
the shaft being rotatable between a locking position, in which the blow mold is locked, and an unlocking position, in which the blow mold can be opened, and the shaft having such an external contour that the shaft is, in the locking position, at least partially applied against the locking element and, in the unlocking position, releases the locking element; and
wherein the blow molding machine is adapted to stretch blow pre-molded blanks.

12. A blow mold (1) with mold parts (3, 4) for a stretch blow molding machine or the like, comprising at least one locking element (9, 28) attached to a first mold part (3), and at least one counter-element (10-a, b, c) attached to a second mold part (4), the counter-element (10-a, b, c) being a shaft (10-a, b, c), which is locked by means of rotation around a longitudinal axis (16-a, b, c) proceeding through the shaft, the shaft being rotatable between a locking position, in which the blow mold (1) is locked, and an unlocking position, in which the blow mold (1) can be opened, and the shaft (10-a, b, c) having such an external contour that the shaft (10-a, b, c) is, in the locking position, at least partially applied against the locking element (9,28) and, in the unlocking position, releases the locking element (9, 21);
wherein two shafts (10-a, b) are attached on the second mold part (4), each of which shafts can each be rotated around a respective longitudinal axis (16-a, b) proceeding through it, between the locking position and the unlocking position; and wherein both of the shafts (10-*a, b*) are attached at a distance from one another in such a manner that, in the unlocking position, the locking element (9) is at least partially guided between both of the shafts (10-*a, b*) and, in the locking position, the contours of the two shafts (10-*a, b*) are at least partially applied to the locking element (9) in such a manner that the blow mold is solidly locked.

* * * * *